US011092792B2

(12) United States Patent
Fahrbach et al.

(10) Patent No.: US 11,092,792 B2
(45) Date of Patent: Aug. 17, 2021

(54) METHOD AND APPARATUS FOR EXAMINING A SAMPLE USING STRUCTURED LIGHT-SHEET ILLUMINATION

(71) Applicant: LEICA MICROSYSTEMS CMS GMBH, Wetzlar (DE)

(72) Inventors: Florian Fahrbach, Heidelberg (DE); Werner Knebel, Kronau (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 261 days.

(21) Appl. No.: 15/766,375

(22) PCT Filed: Oct. 10, 2016

(86) PCT No.: PCT/EP2016/074123
§ 371 (c)(1),
(2) Date: Aug. 27, 2018

(87) PCT Pub. No.: WO2017/060506
PCT Pub. Date: Apr. 13, 2017

(65) Prior Publication Data
US 2019/0025563 A1    Jan. 24, 2019

(30) Foreign Application Priority Data

Oct. 9, 2015    (DE) .......................... 102015117274.7

(51) Int. Cl.
*G02B 21/00*    (2006.01)
*G02B 21/36*    (2006.01)
(Continued)

(52) U.S. Cl.
CPC ..... *G02B 21/0076* (2013.01); *G02B 21/0032* (2013.01); *G02B 21/0056* (2013.01);
(Continued)

(58) Field of Classification Search
CPC ............ G02B 21/0032; G02B 21/0076; G02B 21/0056; G02B 21/18
See application file for complete search history.

(56) References Cited

U.S. PATENT DOCUMENTS 6,255,642 B1 *  7/2001  Cragg .................... G02B 21/36
                                                          250/216
7,554,725 B2    6/2009  Stelzer et al.
(Continued)

FOREIGN PATENT DOCUMENTS

CN    103477209 A    12/2013
DE    10257423 A1     6/2004
(Continued)

OTHER PUBLICATIONS

Chang, Bo-Jui, et al. "CsiLSFM Combines Light-Sheet Fluorescence Microscopy and Coherent Structured Illumination fora Lateral Resolution below 100 Nm." Proceedings of the National Academy of Sciences, vol. 114, No. 19, 2017, pp. 4869-4874., doi:10.1073/pnas.1609278114 (Year: 2017).*
(Continued)

*Primary Examiner* — Zachary W Wilkes
(74) *Attorney, Agent, or Firm* — Leydig, Voit & Mayer, Ltd.

(57) ABSTRACT

A method for examining a sample in light sheet fluorescence microscopy includes generating an illumination light beam using a light source. The illumination light beam is spatially split into at least two partial illumination light beams using a splitter. The partial illumination light beams are guided through an illumination objective shared by the partial illumination light beams. After the partial illumination light beams have passed through the illumination objective, at least one of the partial illumination light beams is deflected using at least one deflector such that the partial illumination light beams interfere with one another in an illumination
(Continued)

plane so as to generate an illumination pattern in the illumination plane. An image of a sample region illuminated by the illumination pattern is produced, wherein detection light that emanates from the sample region reaches a position-sensitive detector through a detection objective.

27 Claims, 16 Drawing Sheets

(51) Int. Cl.
  G02B 21/06    (2006.01)
  G02B 21/18    (2006.01)
  G02B 27/58    (2006.01)
  G02B 21/10    (2006.01)
  G02B 21/16    (2006.01)
  G02B 1/16     (2015.01)

(52) U.S. Cl.
  CPC ............ *G02B 21/06* (2013.01); *G02B 21/10* (2013.01); *G02B 21/16* (2013.01); *G02B 21/18* (2013.01); *G02B 21/367* (2013.01); *G02B 27/58* (2013.01)

(56) References Cited

U.S. PATENT DOCUMENTS

| | | | |
|---|---|---|---|
| 7,787,179 B2 | 8/2010 | Lippert et al. | |
| 8,362,448 B2 | 1/2013 | Wolleschensky et al. | |
| 9,404,867 B2 | 8/2016 | Kempe et al. | |
| 9,477,072 B2* | 10/2016 | Cooper | G02B 21/0076 |
| 9,500,846 B2* | 11/2016 | Betzig | G02B 21/0064 |
| 9,709,788 B2 | 7/2017 | Schumann | |
| 2011/0036996 A1* | 2/2011 | Wolleschensky | G01N 21/6458 250/459.1 |
| 2013/0335819 A1 | 12/2013 | Cooper | |
| 2014/0139840 A1 | 5/2014 | Judkewitz et al. | |
| 2015/0205087 A1* | 7/2015 | Schumann | G02B 21/0032 359/386 |

FOREIGN PATENT DOCUMENTS

| | | |
|---|---|---|
| DE | 102007015063 A1 | 10/2008 |
| DE | 102007047466 A1 | 4/2009 |
| DE | 102008009216 A1 | 8/2009 |
| DE | 102009055216 A1 | 6/2011 |
| WO | WO 2014026683 A1 | 2/2014 |

OTHER PUBLICATIONS

Fu, Q., Martin, B., Matus, D. et al. Imaging multicellular specimens with real-time optimized tiling light-sheet selective plane illumination microscopy. NatCommun 7, 11088 (2016). https://doi.org/10.1038/ncomms11088 (Year: 2016).*

Peter W. Winter, Panagiotis Chandris, Roberts Fischer, Yicong Wu, Clare M Waterman, and Hah Shroff, "Incoherent structured illumination improves optical sectioning and contrast in multiphoton super-resolution microscopy," Opt. Express 23, 5327-5334 (2015) (Year: 2015).*

Jan Huisken and Didier Y. R. Stainier, "Even fluorescence excitation by multidirectional selective plane illumination microscopy (mSPIM)," Opt. Lett. 32, 2608-2610 (2007) (Year: 2007).*

Philipp J Keller et al: "Fast, high-contrast imaging of animal development with scanned light sheet-based structured-illumination microscopy", HHS Public Access Author Manuscript, vol. 7, No. 8, Jul. 4, 2010 (Jul. 4, 2010), pp. 637-642, XP055226520.

Kavya Mohan et al: "Three Dimensional Fluorescence Imaging Using Multiple Light-Sheet Microscopy", PLOS One, vol. 9, No. 6, Jun. 9, 2014 (Jun. 9, 2014), pp. 96551, XP055277114.

* cited by examiner

METHOD AND APPARATUS FOR EXAMINING A SAMPLE USING STRUCTURED LIGHT-SHEET ILLUMINATION

CROSS-REFERENCE TO PRIOR APPLICATIONS

This application is a U.S. National Stage Application under 35 U.S.C. § 371 of International Application No. PCT/EP2016/074123 filed on Oct. 10, 2016, and claims benefit to German Patent Application No. DE 10 2015 117 274.7 filed on Oct. 9, 2015. The International Application was published in German on Apr. 13, 2017, as WO 2017/060506 A1 under PCT Article 21(2).

FIELD

The invention relates generally to a method and to a device for examining a sample, and in particular in light sheet fluorescence microscopy.

BACKGROUND

The SPIM (single plane illumination microscopy) technique, in which a sample is illuminated in layers, allows image data to be detected more quickly and in a gentler manner for the sample than scanning a sample at specific points, for example. A known field of use of SPIM technology is the field of fluorescence microscopy, in which fluorophores are excited in the sample by means of laser light. In SPIM technology, excitation takes place in only one plane of an illumination light sheet (also referred to as a "light strip"). Damage to the sample caused by illumination light in other planes is thus avoided.

DE 102 57 423 A1 describes an optical device that functions in accordance with the SPIM method. In this microscope, a sample is illuminated by a thin light sheet, whilst being observed from a direction perpendicular to the plane of the illuminating light sheet. In the process, the illumination and the detection take place over two separate optical beam paths each having a separate optical system. The light sheet is generated by a cylindrical lens. To take the image, the sample is moved through the light sheet, which is stationary in relation to the detector, in order to record fluorescent light and/or scattered light in layers using a two-dimensional detector. The layered image data thus obtained can then be compiled to form a dataset corresponding to a three-dimensional image of the sample.

DE 10 2007 015 063 A1 discloses an optical arrangement having a light source for emitting a light beam and optical elements for converting said light beam into the form of a light sheet. The optical arrangement is particularly suitable for illuminating individual planes of a three-dimensional sample in selective plane illumination microscopy (SPIM). Means for varying the cross section of the light sheet, varying the length of the light sheet and/or for influencing the direction of the radiation components extending within the light sheet are provided in order to allow the geometry of the light sheet to be adapted to the illumination requirements when the same sample plane is observed using a plurality of different objectives.

Alternatively to illuminating the sample directly, it is also possible to illuminate the sample in an evanescent manner. In this case, excitation light undergoes total reflection at a boundary surface with the sample and in the process the sample is excited by the evanescent electromagnetic field, which decays as the penetration depth increases. For this form of sample examination, the term TIRF microscopy or TIRFM (total internal reflection fluorescence microscopy) has become commonly used.

SUMMARY

In an embodiment, the present invention provides a method for examining a sample. An illumination light beam is generated using a light source. The illumination light beam is spatially split into at least two partial illumination light beams using a splitter. The partial illumination light beams are guided through an illumination objective shared by the partial illumination light beams. After the partial illumination light beams have passed through the illumination objective, at least one of the partial illumination light beams is deflected using at least one deflector such that the partial illumination light beams interfere with one another in an illumination plane so as to generate an illumination pattern in the illumination plane. An image of a sample region illuminated by the illumination pattern is produced, wherein detection light that emanates from the sample region reaches a position-sensitive detector through a detection objective.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
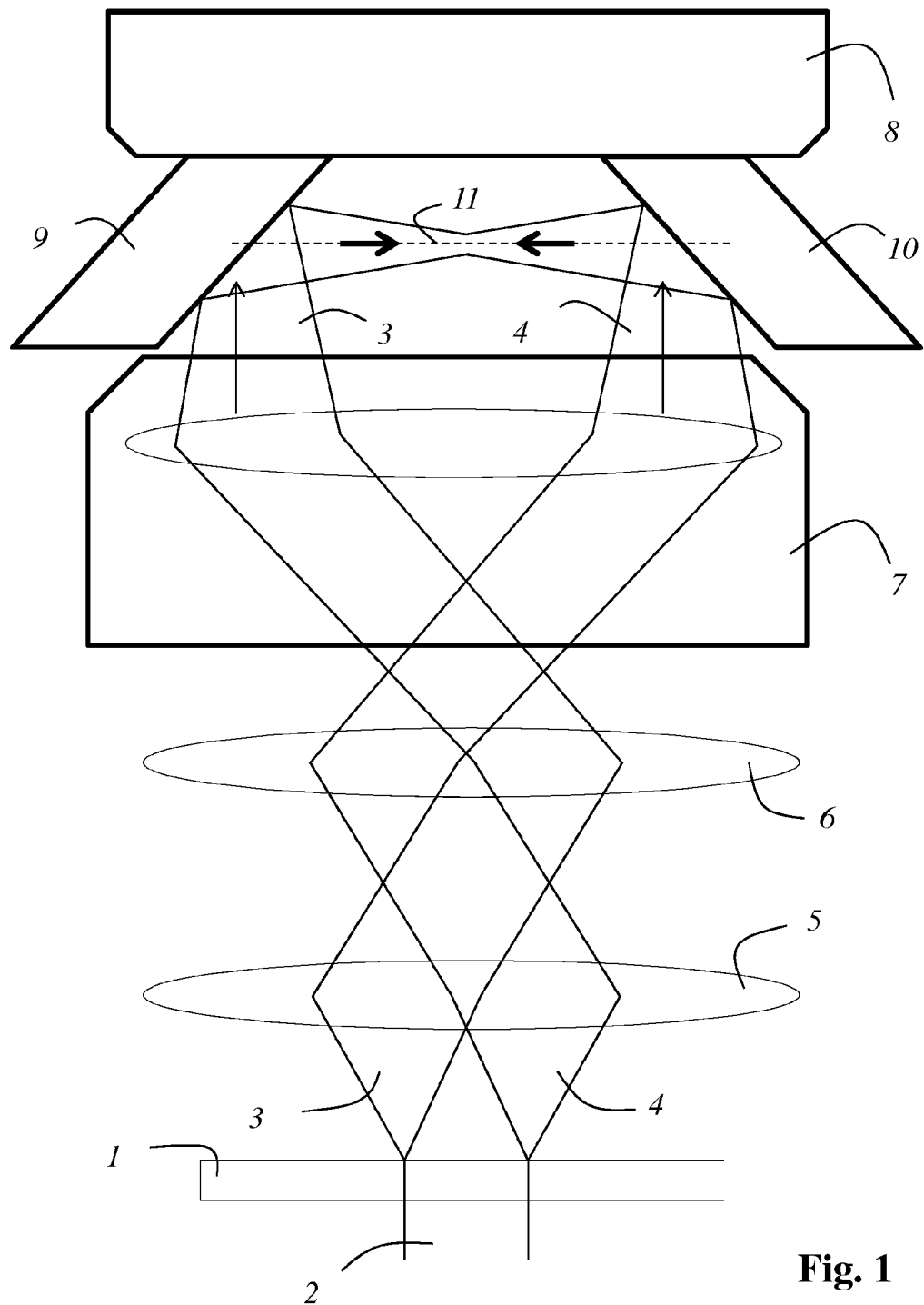
FIG. 1 shows an embodiment of a detail of a device according to the invention.

In an embodiment, present invention provides a method for examining a sample that ensures good sample accessibility while improving image quality.

According to the method, this is achieved by a method comprising the following steps:

a. generating an illumination light beam using a light source,
b. spatially splitting the illumination light beam into at least two partial illumination light beams using a splitting means,
c. guiding the partial illumination light beams through an illumination objective shared by the two partial illumination light beams,
d. deflecting at least one of the partial illumination light beams, after they have passed through the illumination objective, by means of at least one deflection means such that the partial illumination light beams interfere with one another in an illumination plane to generate an illumination pattern in the illumination plane, and
e. producing an image of a sample region illuminated by the illumination pattern, detection light that emanates from the sample region reaching a position-sensitive detector through a detection objective.

Another embodiment of the present invention provides a device for examining a sample that ensures good sample accessibility while improving image quality.

The device comprises:

a. a light source that generates an illumination light beam,
b. a splitting means that spatially splits the illumination light beam into at least two partial illumination light beams,
c. an illumination objective through which the partial illumination light beams pass,
d. at least one deflection means that deflects at least one of the partial illumination light beams, after they have passed through the illumination objective, such that the partial illumination light beams interfere with one another in an illumination plane to generate an illumination pattern in the illumination plane, and
e. a position-sensitive detector for producing an image of a sample region illuminated by the illumination pattern, detection light that emanates from the sample region reaching a position-sensitive detector through a detection objective.

A particular advantage of the invention is that illuminating using an illumination pattern can improve the quality of the image in light sheet fluorescence microscopy and/or in TIRF microscopy. This is firstly because illuminating using an illumination pattern generated by the interference of at least two partial illumination light beams makes it possible to at least suppress the background. In particular, however, the resolution can also be advantageously increased, as will be described in detail below. A particular advantage of this is that the partial illumination light beams made to interfere with one another in order to generate the illumination pattern pass through the same illumination objective, and so there only needs to be one illumination objective present in the region of the sample; this allows for particularly good sample accessibility.

In principle, it is known in widefield microscopy or TIRF microscopy to increase the lateral resolution and image contrast in a microscope by means of structured illumination. However, illumination through the detection objective is disadvantageous in that the possible angles of incidence and thus the possible periods of the interference pattern are highly restricted by the numerical aperture of the detection objective. In SPIM microscopy, it has hitherto not been known to increase the resolution in the image plane isotropically or in all three directions in space by means of structured illumination.

Generally, the increase in the resolution is dependent on the period of the lattice. If illumination is carried out through the detection objective using a lattice, this is mostly done such that the illumination light is radiated into the sample volume in two opposite directions at a steep angle to the optical axis, such as to generate a vertical wave as an interference pattern, the period of which is dependent on the angle $2\alpha$ between the two beams. In the process, the angle $\alpha=\arcsin(NA/n)$ depends in particular on the numerical aperture (NA) of the detection objective and the refractive index of the medium. Typically, NA<1.2 and so $\alpha<65°$ in water (n=1.33). In each case, the angle $\alpha$ is significantly less than 90°, although an angle of 90° would be optimum to reach the minimum period of the interference pattern. Disadvantageously, before and after they reach the plane of focus of the detection objective, the interfering beams shine through large parts of the sample and excite fluorescence at those points, i.e. above and below the plane of focus of the detection objective (except for in TIRF); this causes a strong background signal in the image, unnecessarily bleaches the fluorophores at that point and damages the sample due to phototoxic effects.

According to an embodiment of the invention, these disadvantages are advantageously prevented or reduced, in particular when examining a sample using SPIM. In the process, it is even possible, in particular in order to increase the resolution, to generate the illumination pattern by superimposing two, three or an even greater number of illumination light beams, without there needing to be an identical number of illumination objectives. Using a multiplicity of illumination objectives would be expensive, complex and prone to faults. Nonetheless, it is almost impossible to spatially combine a detection objective needed for achieving higher resolutions with a plurality of (for example four) illumination objectives in such a way that the illumination objective can focus the necessary partial illumination light beams into the plane of focus of the detection objective, since high-aperture objectives have large diameters and require short operating distances to ensure the objectives collide in space unless special and thus expensive illumination objectives having a particularly large operating distances and typically a low numerical aperture are used. Another problem with using a multiplicity of illumination objectives would be that high-aperture objectives also manipulate the polarization of the light such as to prevent the partial illumination light beams from interfering completely, as a result of which, for example, zeros of the illumination pattern are less pronounced and/or the contrast of the illumination pattern is reduced overall, which would be detrimental to the image quality. The present invention prevents these drawbacks.

In particular, to produce an image that is super-resolved isotropically in the image plane, different and/or differently positioned and/or differently oriented illumination patterns can be generated one after the other in the illumination plane and each used to illuminate the same sample region. The data of the images thus produced can then be offset with each other in order to increase the overall resolution. For this purpose, an illumination pattern can be altered in various ways, for example in terms of a lattice constant and/or in terms of its position and/or in terms of its orientation, in order to generate a different illumination pattern in each case.

For example, the relative phase of the partial illumination light beams can be altered. This can be done, for example, by altering the optical light path of a subset of the interfering partial illumination light beams. Alternatively or in addition, it is also possible to alter the direction of incidence of the interfering partial illumination light beams. This can be done, for example, by deflecting each partial illumination light beam using differently arranged deflection means or differently arranged deflection elements of a deflection means before said beams interfere with one another, such that the interfering partial illumination light beams each impinge from different directions, as will be described below in detail.

Alternatively or in addition, it is also possible to alter the angles of incidence of the interfering partial illumination light beams on the illumination plane, in particular by a lattice constant for example.

In a particularly advantageous embodiment of the method according to the invention, an additional illumination pattern is generated in addition to the illumination pattern and is coherently or incoherently superimposed on the illumination pattern.

For example, an additional illumination pattern can be generated by at least two additional partial illumination light beams being split off from the illumination light beam and interfering with one another in the illumination plane. Alternatively, it is also possible for at least two additional partial light beams to be generated by means of an additional light source and to interfere with one another in the illumination plane such as to generate the additional illumination pattern in the illumination plane.

In this way, for example, a super-resolved image can also be produced. Superimposing a plurality of illumination patterns generally produces a high-frequency illumination pattern in the illumination plane. If the relative phase of each partial illumination light beam belonging to an illumination pattern is then altered, this also alters the phase of the high-frequency lattice, and so the resultant image data can be used as raw data for producing or computing a super-resolved image of the sample region illuminated in the illumination plane and/or an image thereof having enhanced contrast. In this respect, it can in particular be advantageous for the sample to be illuminated in the illumination plane by means of a plurality of crossed, coherently superimposed illumination lattices.

Apart from coherently superimposing illumination patterns, in particular superimposing crossed illumination lattices, it is also possible (as already mentioned) to incoherently superimpose at least one additional illumination pattern on the illumination pattern. (The main difference between the two superimposition methods is that isolated maxima are produced in one case, e.g. for excitation, and isolated minima/zeros are produced in the other case. Incoherent superimposition can be understood as simply being the sum of the two lattices: The lattices are superimposed without any deviations being caused due to interference.) The resultant illumination pattern is then of an annular nature. In particular, real zeros are then located only in the center or at the intersections of the (linear) zeros of the two crossed lattices. When one additional illumination pattern rotated through 90° in the illumination plane is incoherently superimposed on an illumination pattern, the real zeros are still located only in the center of the illumination plane within a square formed of four adjacent points (intensity maxima). In addition, an overall illumination pattern generated by means of incoherent superimposition also has a smaller period. In particular, the illumination pattern generated by incoherent superimposition can also be exploited for parallelized STED or RESOLFT experiments if excitation light of a different, suitable wavelength is radiated concurrently or alternately (alternately in switchable fluorophores, simultaneously in STED/RESOLFT techniques).

In a particularly desirable manner, it is also possible to superimpose two lattices of different wavelengths. Using light of a first wavelength, a point lattice is generated by means of coherent superimposition, the maxima of which are located at the zeros of a lattice generated using light of a second wavelength and by means of incoherent superimposition. In the process, the first wavelength is capable of exciting the fluorophores and the second wavelength is capable of relaxing the fluorophores in a stimulated manner by means of an STED process or of switching them by means of RESOLFT, as will be explained below.

Compared with widefield set-ups for RESOLFT experiments (reversible saturable optical fluorescence transitions), the present invention has the particular advantage of a higher spatial frequency of the resultant illumination pattern and the higher resolution that can be achieved as a result. In addition, a higher resolution can also be achieved at lower illumination light powers in RESOLFT experiments and STED experiments (stimulated emission depletion) due to the higher lattice frequency. Moreover, the present invention is also advantageous due to the light being used more efficiently, since illumination is only carried out in a narrow region outside the illumination plane.

In a particularly advantageous embodiment, the interfering partial illumination light beams and/or the additional interfering partial illumination light beams are formed as Bessel beams. Particularly advantageously, the interfering partial illumination light beams and/or the additional interfering partial illumination light beams can be formed as sectioned Bessel beams. In particular, the interfering Bessel beams can initially be moved back and forth relative to one another in a synchronous manner in the illumination plane, for example by using one or more beam deflection apparatuses, the deflection angles of which can be adjusted.

The background for illumination using Bessel beams or sectioned Bessel beams is as follows:

If the light passing through an annular diaphragm is focused, intensity maxima are produced along the optical axis in the region of the focus due to structural interference. Any disruption in a small portion of the annular illumination light beam has almost no impact on the optical axis in the region of the focus because this is where the overall illumination light interferes. Masking in a small portion outside the optical axis thus barely affects the structural interference. In the regions of the focus that are at an axial distance from the optical axis, any disruption in the region of the incident light is "cured" by the remaining light upstream of the disruption preventing the disruption from casting a shadow.

A Bessel beam generated by annular illumination is rotationally symmetrical with the optical axis. In addition, in a cross section, a Bessel beam of this kind has intensity maxima in the form of concentric rings perpendicularly to the optical axis, the largest intensity maximum being located on the optical axis.

If segments are now masked, in particular symmetrically, from the illumination light, which is annular in cross section, this is referred to as a sectioned Bessel beam. For example, it would be possible to use an annular diaphragm in which two circumferential regions opposite one another in a mirror image are additionally covered. The light then only passes through the two intermediate circumferential regions of the annular diaphragm. In cross section, the focus of a sectioned Bessel beam of this kind is not rotationally symmetrical perpendicularly to the optical axis. Instead, in a sectioned Bessel beam of this kind, parts of the originally annular intensity maxima are masked, and so adjacent curved intensity maxima oriented concavely to the optical axis remain in the form of annular segments or "sections".

By means of a lateral offset by a fraction of the period of the lattice of a sectioned Bessel beam (for example a third of the lattice period), for example using a beam deflection apparatus of which the deflection angle can be adjusted, a plurality of images (two or three images) can be successively produced and image data acquired in each case, from which an overall image having higher contrast can be computed. Alternatively to superimposing two or more illumination patterns oriented perpendicularly to one another, a similar structure can be obtained by making two sectioned Bessel beams extending in opposite directions interfere with one another. In this respect, such an embodiment of the method according to the invention is particularly advantageous for increasing the resolution and/or increasing the contrast. The main advantage of sectioned Bessel beams is that a lattice can be generated by superimposing just two beams from opposite directions. This means that only two reflective caps or objectives are required. The option of also offsetting the lattice sideways by means of a scanning mirror is only required if the width of the image field is greater than that of the sectioned Bessel beam.

If the illumination pattern and the at least one additional illumination pattern interfere coherently, care must be taken to ensure that the partial illumination light beams made to interfere with one another have the same polarization. When using deflection mirrors as deflection elements, care should be taken to ensure that the reflection alters the linear polarization direction of the partial illumination light beam when the partial illumination light beam impinging on the mirror has a linear polarization parallel to the plane of incidence. By contrast, the linear polarization direction is not altered if the incident partial illumination light beam has a linear polarization direction that is perpendicular to the plane of incidence.

If the illumination pattern and the at least one additional illumination pattern are to be incoherently superimposed, this can be achieved for example by said patterns having different polarizations in the illumination plane at the site of the superimposition. For example, two illumination patterns oriented perpendicularly to one another and generated by four partial illumination light beams (two in each case) are superimposed incoherently, the partial illumination light beams having the same polarization in the entrance pupil of the illumination objective and each being deflected, once they have passed through the illumination objective, into the illumination plane, in particular by 90°, by one of four deflection mirrors oriented relative to one another in a square, since said beams have linear polarization directions that are perpendicular to one another after being deflected in the illumination plane due to the aforementioned effects as regards the linear polarization upon reflection.

If incoherent superimposition of the illumination patterns is desired, it is also possible to illuminate them in a pulsed manner, the pulse length, repetition rate and the offset over time of the light pulses of the illumination pattern relative to the light pulses of the additional illumination pattern being selected such that the illumination pattern and the additional illumination pattern are generated alternately in the illumination plane at different times.

To obtain incoherent superimposition, it is alternatively also possible to use different light sources to generate the light for the illumination pattern and for the additional illumination pattern because light from independent light sources per se has no coherence.

Another option for obtaining incoherent superimposition involves designing the light path of the partial illumination light beams and the light path of the additional partial illumination light beams such that the light path lengths differ from one another by more than the coherence length. For example, the illumination light for the illumination pattern could be coupled into the sample volume directly whilst the light for the additional illumination pattern is guided through a long glass fiber that is longer than the coherence length, or vice versa.

Alternatively, it is also possible to couple the light for generating the illumination pattern and the light for generating the additional illumination pattern into one polarization-preserving glass fiber each, these fibers being rotated relative to one another or not rotated relative to one another. In the process, the light from the light source is coupled into four fibers, which in turn couple the light into the pupil of the illumination objective. In this case, the fibers are each arranged opposite one another in pairs and are rotated such that the emitted light is polarized in the same direction. By means of this arrangement, it is simple to alternate between coherently superimposing and incoherently superimposing the crossed lattices by rotating the individual fibers of one pair of opposite fibers by 90° about their own axis (and specifically only at one end opposite the other fiber).

As a further alternative for obtaining incoherent superimposition, it is also possible to use a modulator, e.g. an acousto-optic modulator (AOM) or an acousto-optic deflector (AOD), to thus manipulate the frequency of the illumination light of the partial illumination light beams in such a way as to stop said beams from interfering with the non-manipulated light of the additional partial illumination light beams. The modulator should be able to shift the frequency of the light, for example by photon-photon interaction.

If, however, coherent superimposition is desired, the linear polarization direction of the two partial illumination light beams of one of the illumination patterns can be rotated, for example by means of a $\lambda/2$ plate. For this purpose, in a particularly advantageous embodiment, a phase plate having four quadrants is used, two diagonally opposite quadrants not influencing the linear polarization direction while the two other diagonally opposite quadrants are each formed as $\lambda/2$ phase plates. For example, the partial illumination light beams generating the illumination pattern can each extend through one of two diagonally opposite quadrants, while the additional partial illumination light beams generating the additional illumination pattern can each extend through one of the two other diagonally opposite quadrants.

The phase plate can advantageously be arranged in a plane conjugate to the plane of focus of the illumination objective. Alternatively to a phase plate, it is also possible to influence the polarization by means of active optical components, such as a spatial light modulator (SLM), in particular a ferroelectric SLM, or for example by means of a liquid crystal on silicon component (LCoS). The use of such components is particularly advantageous in that the polarization can be altered in a location-dependent and individually controlled manner. In this way, the illumination pattern and/or the at least one additional illumination pattern can be advantageously altered in a simple, quick and reliable manner, and/or switching from coherently superimposing the illumination patterns to incoherently superimposing the illumination patterns can be done quickly.

As described above, in the case of structured light, a plurality of images can be taken using the illumination pattern and/or the additional illumination pattern by successively shifting the illumination patterns in the illumination plane. For this purpose, the relative phase of the partial illumination light beams generating the illumination pattern or the partial illumination light beams generating the additional illumination pattern can be altered. This can be done, for example, by altering the length of the light path of a subset of the interfering partial illumination light beams or additional partial illumination light beams. The length of the light path can be altered, for example, by means of an active mirror that can be shifted by a piezo element, for example. Alternatively or in addition, it is also possible to use an acousto-optic element. As a further alternative to altering the light path, it is also possible to selectively insert into the beam path different optical elements of different thicknesses and/or different optical densities. It is also possible to use SLMs, digital mirror devices (DMD) or deformable mirrors (DM) to alter the light path.

The splitting means can, for example, comprise a simple beam splitter or a polarization beam splitter. In a particular embodiment, the splitting means comprises a phase lattice. An embodiment of this kind is particularly advantageous because a largely symmetrical beam path can be achieved for the different partial illumination light beams.

The deflection means can, for example, comprise one or more mirrors (deflection mirrors) as deflection elements. In particular, the mirrors can be planar. It is also possible, however, for one or more mirrors to be curved. Alternatively or in addition, it is also possible for the deflection means to comprise at least one prism.

The device according to the invention can advantageously comprise a deflection means, which deflects the illumination light beam, after it has passed through the illumination objective, such that the illumination light beam extends in the illumination plane. In particular, the deflection means can be arranged in such a way that the deflected illumination light beam is at an angle other than 0° to the optical axis of the illumination objective and/or of the detection objective. In particular, the illumination plane can be oriented perpendicularly to the optical axis of the illumination objective.

In particular, the illumination light beam, in particular shaped to form a light sheet, can advantageously firstly extend in the vertical direction through the illumination objective and then be deflected in the horizontal direction by the deflection apparatus, so as to illuminate the sample in the sample plane along the illumination strip. The detection light emanating from the illumination strip, in particular fluorescent light, preferably extends in the vertical direction through a detection objective. A design of this type enables the use of upright or inverse standard microscope stands for the production of the optical device according to the invention.

In a particularly advantageous embodiment, the illumination objective and the deflection apparatus, which can for example comprise one or more deflection mirrors, are arranged movably relative to one another, so as to be able to move the illumination light beam relative to the sample. Alternatively or in addition, the deflection means can also be secured to and/or arranged on the detection objective or the illumination objective, in particular movably.

Preferably, the illumination pattern and/or the additional illumination pattern are used for fluorescence excitation of the sample in the sample plane. Alternatively or in addition, relaxation light is homogeneously applied to the sample plane at the same time.

Most preferably, the illumination pattern is used to switch fluorescence dyes.

In a particularly advantageous manner, the lattice illumination can in principle also be used for RESOLFT-like effects (e.g. STED or ground state depletion (GSD)). The difference from using structured light for the fluorescence excitation is that additional structured light (at a different wavelength) in the sample is superimposed on structured or non-structured light for fluorescence excitation at more or less the same time (e.g. offset in the case of GatedSTED). For example, a "common", e.g. blue light sheet could be radiated into the sample and an e.g. red "lattice" superimposed thereon, the red lattice causing the fluorophores at that point to be relaxed in a stimulated manner, to remain in a dark state or to transfer, as a result of conformation change, into a state that cannot be excited by the blue light sheet, the emission of fluorescence towards the detector always being effectively suppressed by the red light.

According to a variant, the excitation light can also be in the shape of a lattice for this purpose. The excitation maxima would then have to be located in the relaxation minima. The problem here is that the light beams are of different wavelengths and so the same lattice period is not set when the lattices are generated in the same way. As a solution, therefore, it is advantageous to elongate the period of the lattice having the shorter period in order to adjust it to the period of the longer lattice. This can be done by tilting the two light beams, which extend in opposite directions and generate the lattice, towards one another within the illuminated plane (i.e. so they do not extend in opposite directions at an angle of 180°, but rather extend in opposite directions at an angle of 160°, for example).

It should be pointed out here that the concepts described herein in relation to the switchability of the fluorescence dyes and/or the concepts surrounding RESOLFT, STED, GatedSTED and/or GSD can be implemented both in conjunction with the present invention and independently of the specific feature combination in the present invention in accordance with the originally drafted independent claims. In the latter case in particular, it is not necessary for the partial illumination light beams to be guided through an illumination objective shared by the two partial illumination light beams and/or for at least one of the partial illumination light beams to be deflected by means of at least one deflection means, after passing through the illumination objective, such that the partial illumination light beams interfere with one another in an illumination plane so as to generate an illumination pattern in the illumination plane.

A device that is suitable for carrying out the method according to the invention can be constructed advantageously on the basis of a scanning microscope, in particular a confocal scanning microscope. In this case, the use of an inverse microscope stand is particularly advantageous. In this respect, the use of a scanning microscope (possibly provided in a laboratory in any case) is particularly advantageous for carrying out the method according to the invention.

The subject matter of embodiments of the invention is shown in the drawings schematically and by way of example and will be described hereinafter with reference to the drawings, like elements or those having a similar function generally being provided with the same reference numerals.

FIG. 1 shows an embodiment of a detail of a device according to the invention. The device contains a splitting means 1 that spatially splits an illumination light beam 2 into at least two partial illumination light beams 3, 4. The partial illumination light beams 3, 4 pass through a lens 5, which focuses the partial illumination light beams 3, 4, and a tube lens 6, which collimates the partial illumination light beams 3, 4 and couples them into the entrance pupil of an illumination objective 7 in opposite directions in a manner tilted towards the optical axis.

After they have passed through the illumination objective 7, the partial illumination light beams 3, 4 each impinge on one of two deflection mirrors 9, 10, arranged opposite one another on a detection objective 8, of a deflection means, which deflects the partial illumination light beams 3, 4 such that the partial illumination light beams 3, 4 interfere with one another in an illumination plane 11 that is also the plane of focus of the detection objective 8, so as to generate an illumination pattern in the illumination plane 11.

Figure 2:
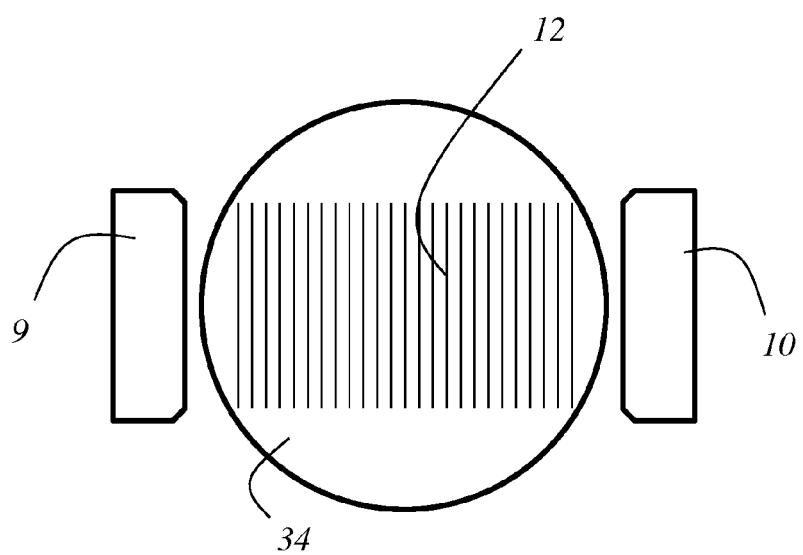
FIG. 2 schematically shows the generation of an illumination pattern in a device according to the invention designed as an SPIM microscope, FIG. 3 schematically shows the generation of the superimposition of an illumination pattern and an additional illumination pattern in a device according to the invention designed as an SPIM microscope, FIG. 4 schematically shows the generation of the superimposition of three additional illumination patterns on an illumination pattern in a device according to the invention designed as an SPIM microscope.

FIG. 2 schematically shows the generation of an illumination pattern 12 in a sample volume 34 in a device according to the invention designed as an SPIM microscope. The illumination pattern 12 is generated in the illumination plane 11 by the interference of two partial illumination light beams that are deflected by opposing deflection elements (specifically deflection mirrors 9, 10), after passing through an illumination objective 7, such that they propagate in the illumination plane in different propagation directions. By way of example, the vertical lines between the deflection mirrors show the positions of the maxima/minima of a vertical wave being formed for two beams that extend in opposite directions and have a planar phase front, as they generally have for illumination beams typical in SPIM microscopes (also referred to as light sheets).

Figure 3:
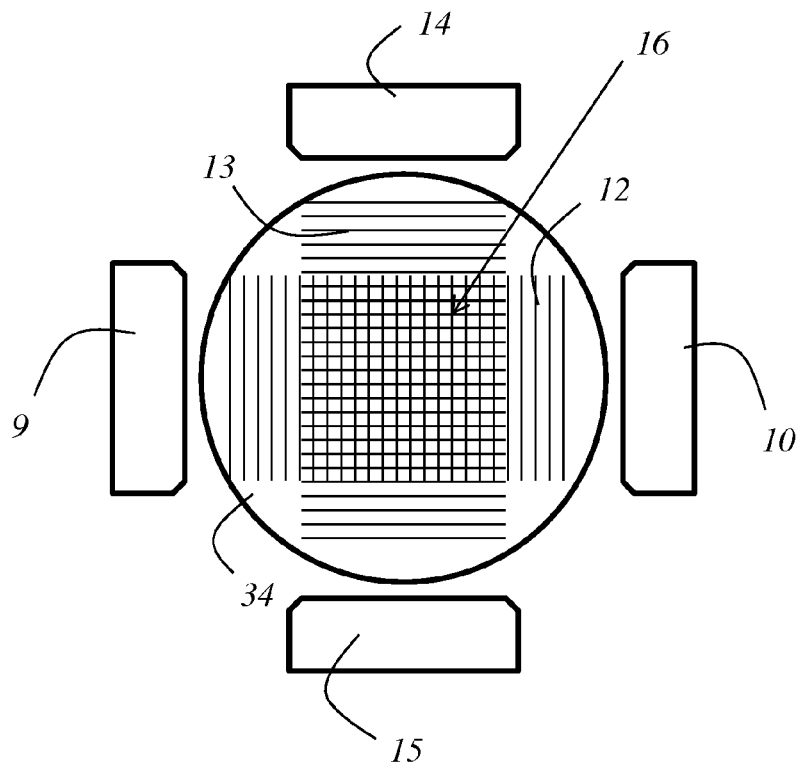

FIG. 3 schematically shows the generation of the superimposition of an illumination pattern 12 and an additional illumination pattern 13 in a device according to the invention designed as an SPIM microscope. The illumination pattern 12 is generated in the illumination plane 11 by the interference of two partial illumination light beams that are deflected by opposing deflection elements (specifically deflection mirrors 9, 10) after passing through an illumination objective. The additional illumination pattern 13 is generated in the illumination plane 11 by the interference of two additional partial illumination light beams that are deflected by additional opposing deflection elements (specifically additional deflection mirrors 14, 15) after passing through an illumination objective. Due to the superimposition and interference of the illumination pattern 12 and the additional illumination pattern 13, a point lattice 16 is generated in the center.

Figure 4:
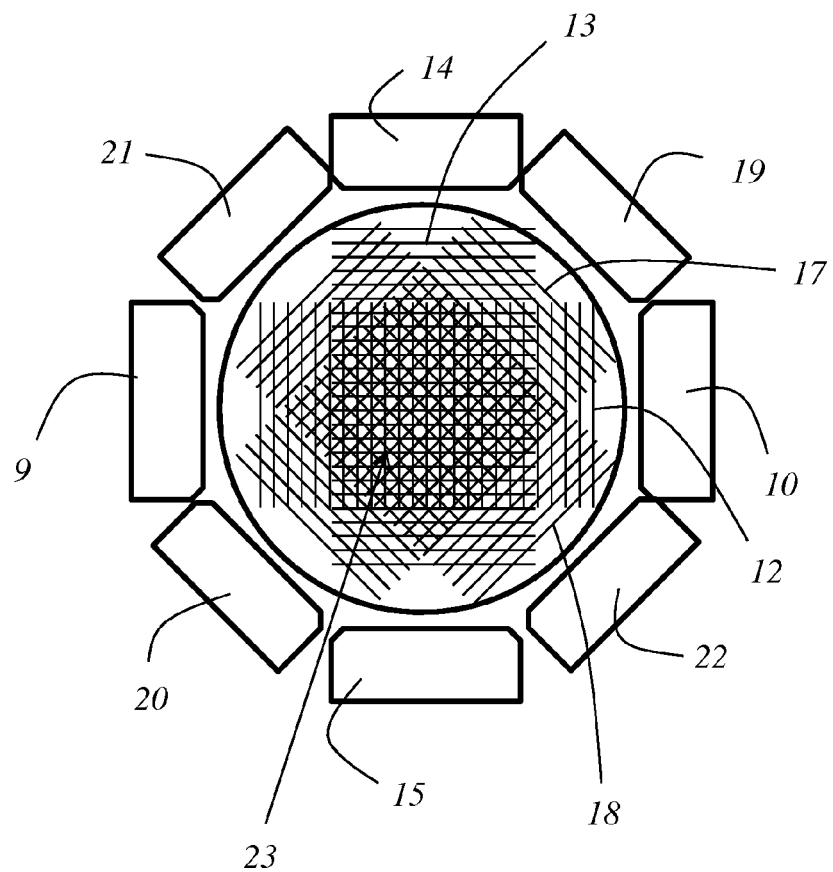

FIG. 4 schematically shows the generation of the superimposition of three additional illumination patterns 13, 17, 18 on an illumination pattern 12 in a device according to the invention designed as an SPIM microscope. It should be pointed out here that FIG. 4 does not necessarily illustrate an actual deflection means, but rather also shows the option of an integration over time that can be implemented by using a rotatable deflection means: The deflection mirrors shown in the drawing can be rigidly installed but do not have to all be present in the design. In particular, a movable pair of deflection mirrors 9, 10 can also be rotatably provided in such a way that the pair can successively assume the positions of deflection mirrors 9, 10, then 21, 22, then 14, 15, and then 19, 20, or any number of any other positions. Ideally in this case, a strip-like illumination pattern 12 is rotated twice by an angle of 60° each time in order to isotropically increase the resolution in the plane 11. This occurs during the exposure of one image by the camera.

If a plurality of mirrors are rigidly installed and their lattices are superimposed, this leads to complex illumination patterns. These would then enable higher-order structured illumination. If the illumination pattern is not a regular sine wave, the lattice has to be shifted more than twice and more than three images have to be taken, although this also increases the resolution further.

The illumination pattern 12 is generated in the illumination plane 11 by the interference of two partial illumination light beams that are deflected by opposing deflection elements (specifically deflection mirrors 9, 10) after passing through an illumination objective. The additional illumination pattern 13 is generated in the illumination plane 11 by the interference of two additional partial illumination light beams that are deflected by (additional) opposing deflection elements (specifically additional deflection mirrors 14, 15) after passing through an illumination objective.

The additional illumination pattern 17 is generated in the illumination plane 11 by the interference of two partial illumination light beams that are deflected by opposing deflection elements, specifically deflection mirrors 19, 20 (or deflection mirrors 9, 10 that have been rotated to the position of 19, 20), after passing through an illumination objective. The additional illumination pattern 18 is generated in the illumination plane 11 by the interference of two additional partial illumination light beams that are deflected by additional opposing deflection elements (specifically additional deflection mirrors 21, 22) after passing through an illumination objective.

By superimposing the additional illumination patterns 13, 17, 18 on the illumination pattern 12, a point lattice 23 is generated in the center. A sub-group of, for example, 12 and 13 or 17 and 18 can also be superimposed on one another.

FIGS. 5A-5I show views of the light distributions when an illumination pattern and an additional illumination pattern are used and superimposed in a device according to the invention designed as an SPIM microscope.

Figure 5A:
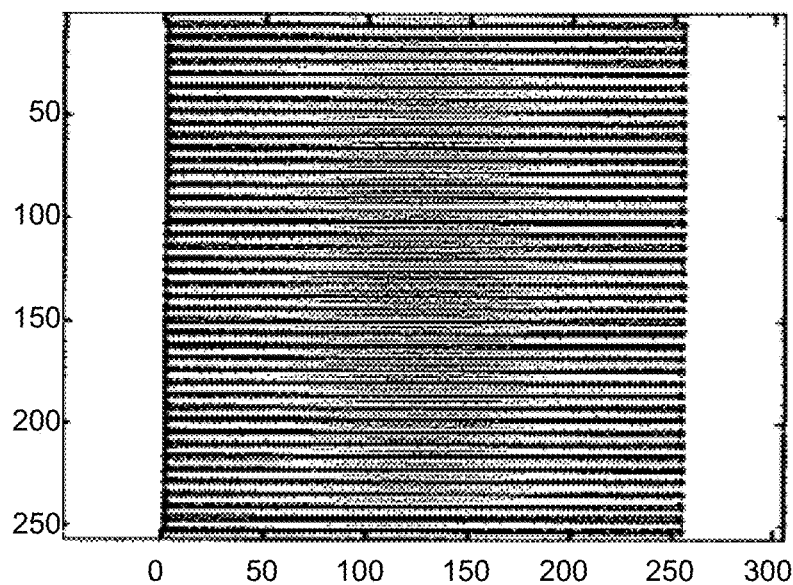
FIGS. 5A-5I show views of the light distributions when an illumination pattern and an additional illumination pattern are used and superimposed in a device according to the invention designed as an SPIM microscope.
Figure 5B:
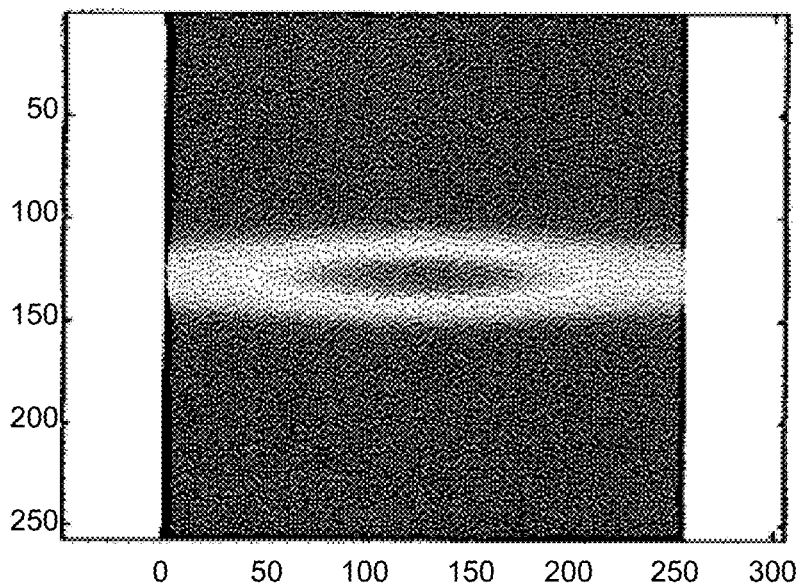
Figure 5C:
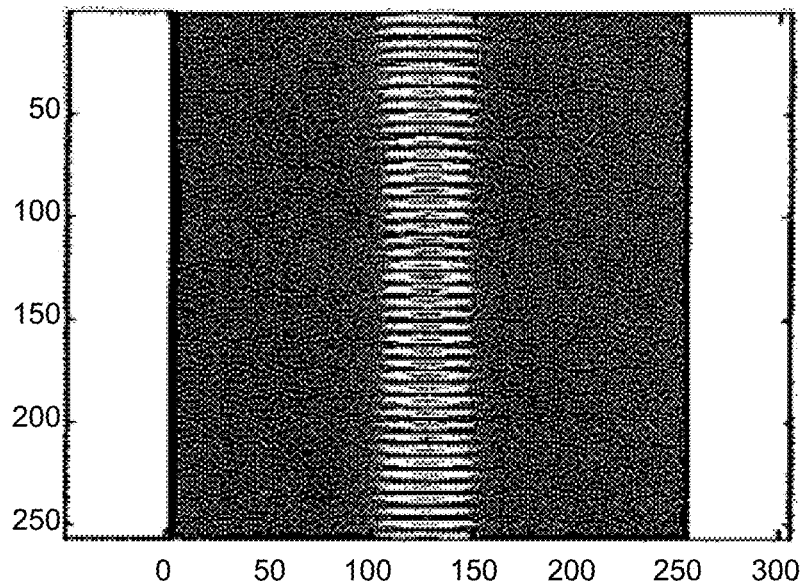

Specifically, FIGS. 5A-5C show three different views of an illumination pattern just generated in the light. FIG. 5A shows the illumination plane 11 when viewed along the optical axis of the detection objective (z-direction). FIGS. 5B and 5C show the illumination pattern when viewed in the x-direction (propagation direction of the beams of the first illumination pattern) and when viewed in the y-direction, which extends perpendicularly to x and z (propagation direction of the beams of the second illumination pattern).

Figure 5D:
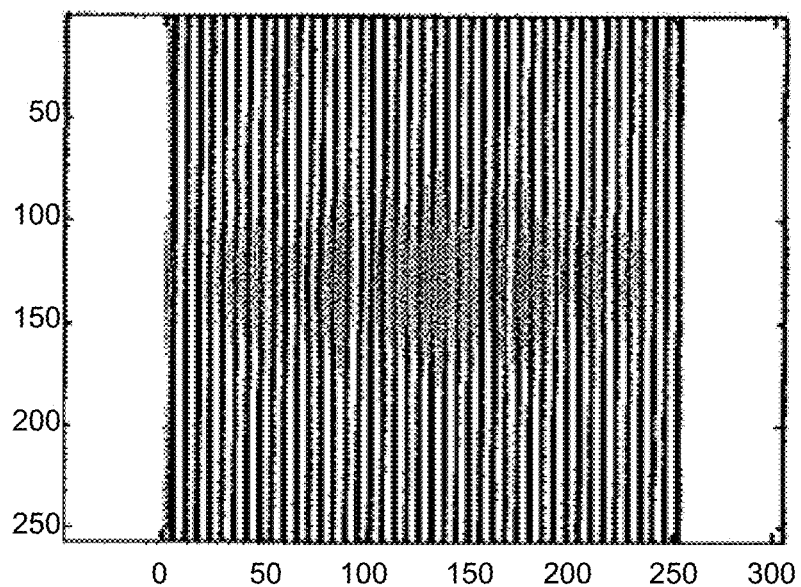
Figure 5E:
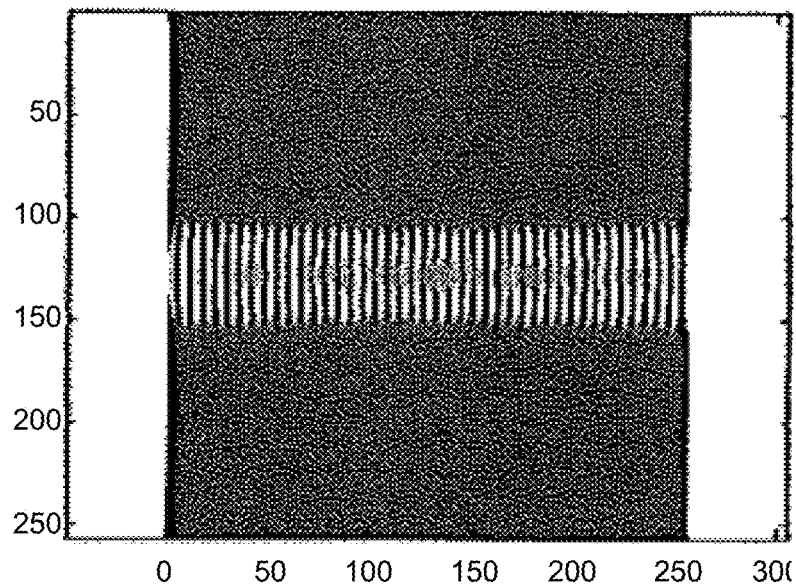
Figure 5F:
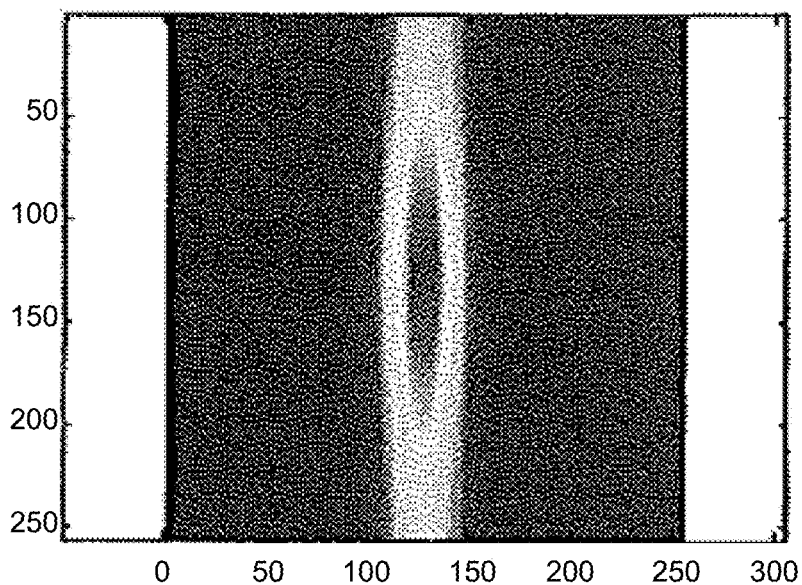

FIGS. 5D-5F show the three different views of an additional illumination pattern just generated in the light, as in FIGS. 5A-5C. The left-hand illustration is a view along the optical axis of the detection objective (z-direction). The two other views show the illumination pattern when viewed in the x-direction and when viewed in the y-direction. The additional illumination pattern is merely rotated by 90° in the light relative to the illumination pattern shown in the top row.

Figure 5G:
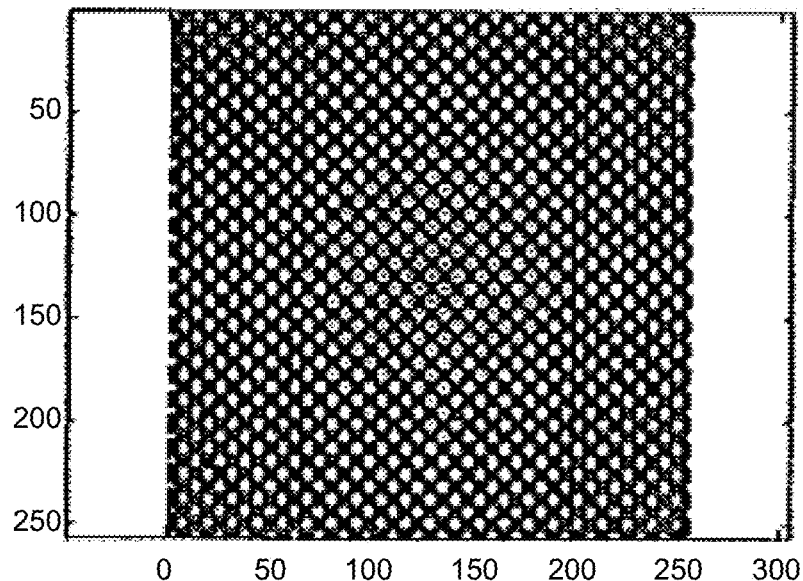
Figure 5H:
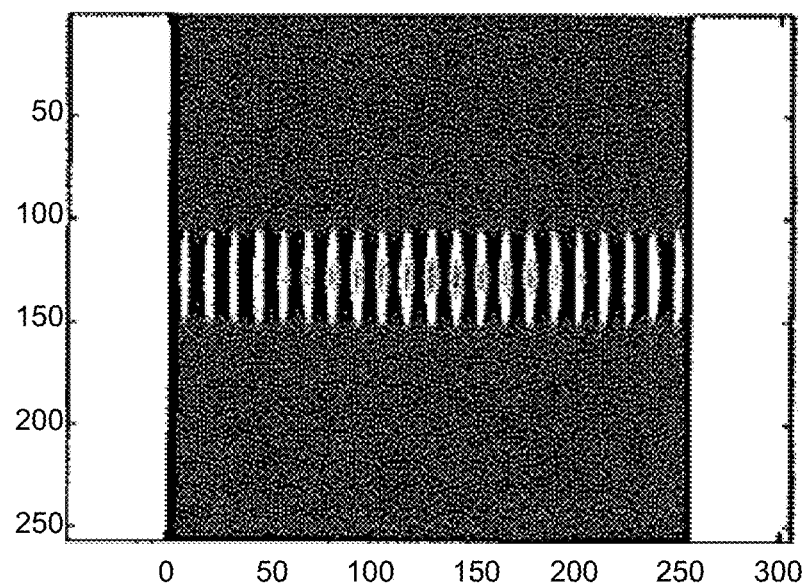
Figure 5I:
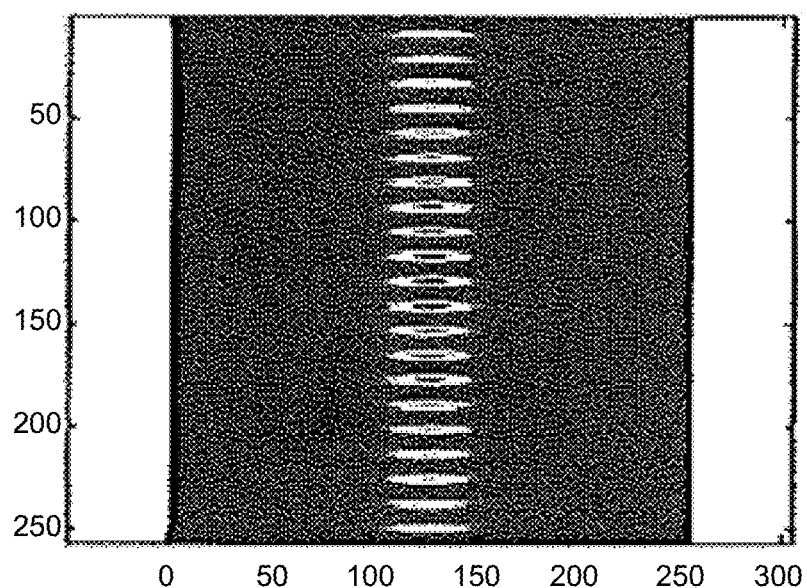

FIGS. 5G-5I show the three different views (as in FIGS. 5A-5C) of the result of the coherent superimposition of the additional illumination pattern on the illumination pattern. FIG. 5G is a view along the optical axis of the direction objective (z-direction). FIGS. 5H and 5I show the illumination pattern when viewed in the x-direction and when viewed in the y-direction.

Figure 6:
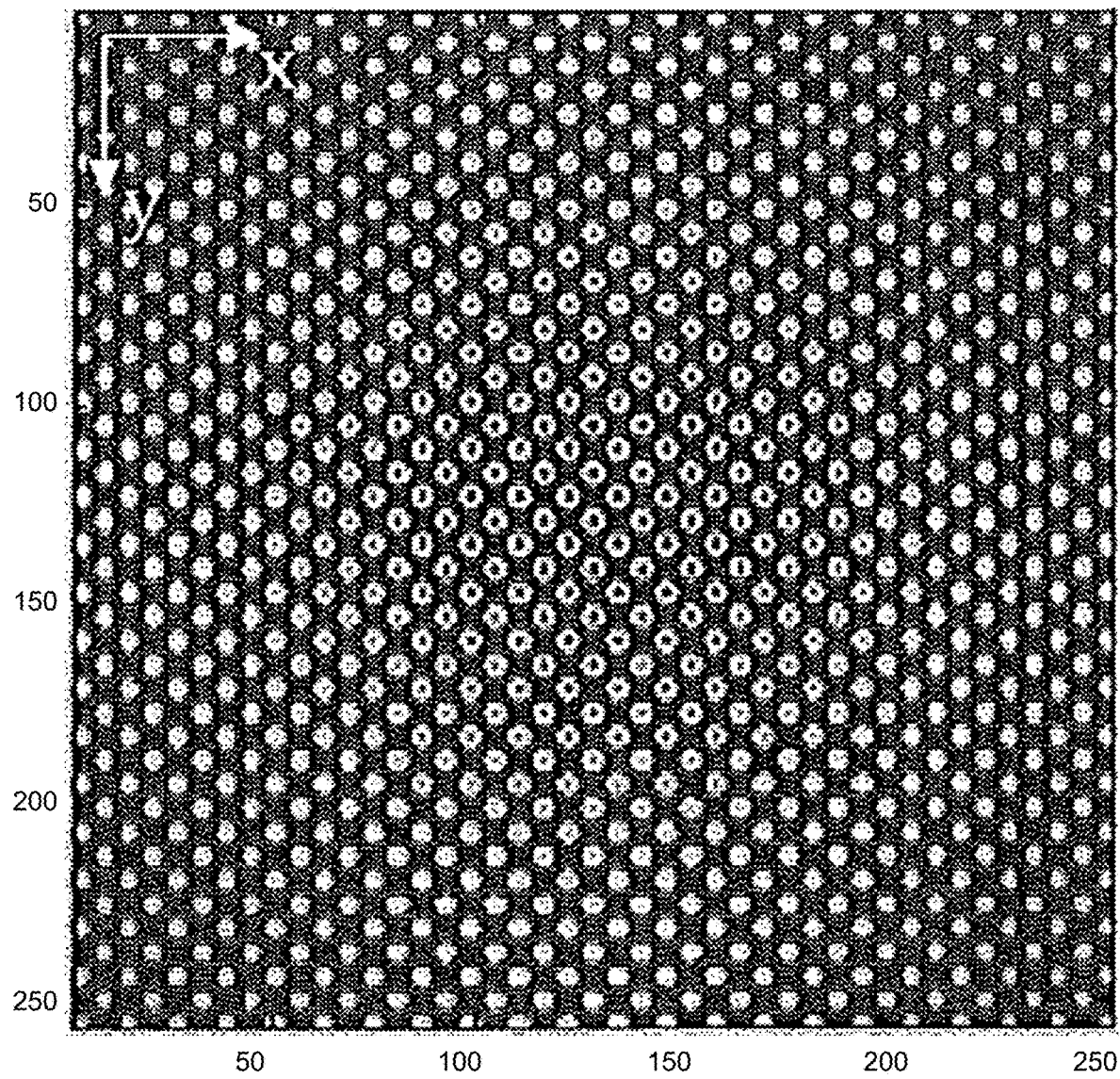
FIG. 6 shows the light distribution when an illumination pattern and an additional illumination pattern are coherently superimposed.

FIG. 6 enlarges the light distribution of the coherent superimposition of the additional illumination pattern on the illumination pattern, as shown in FIGS. 5G-5I.

Figure 7:
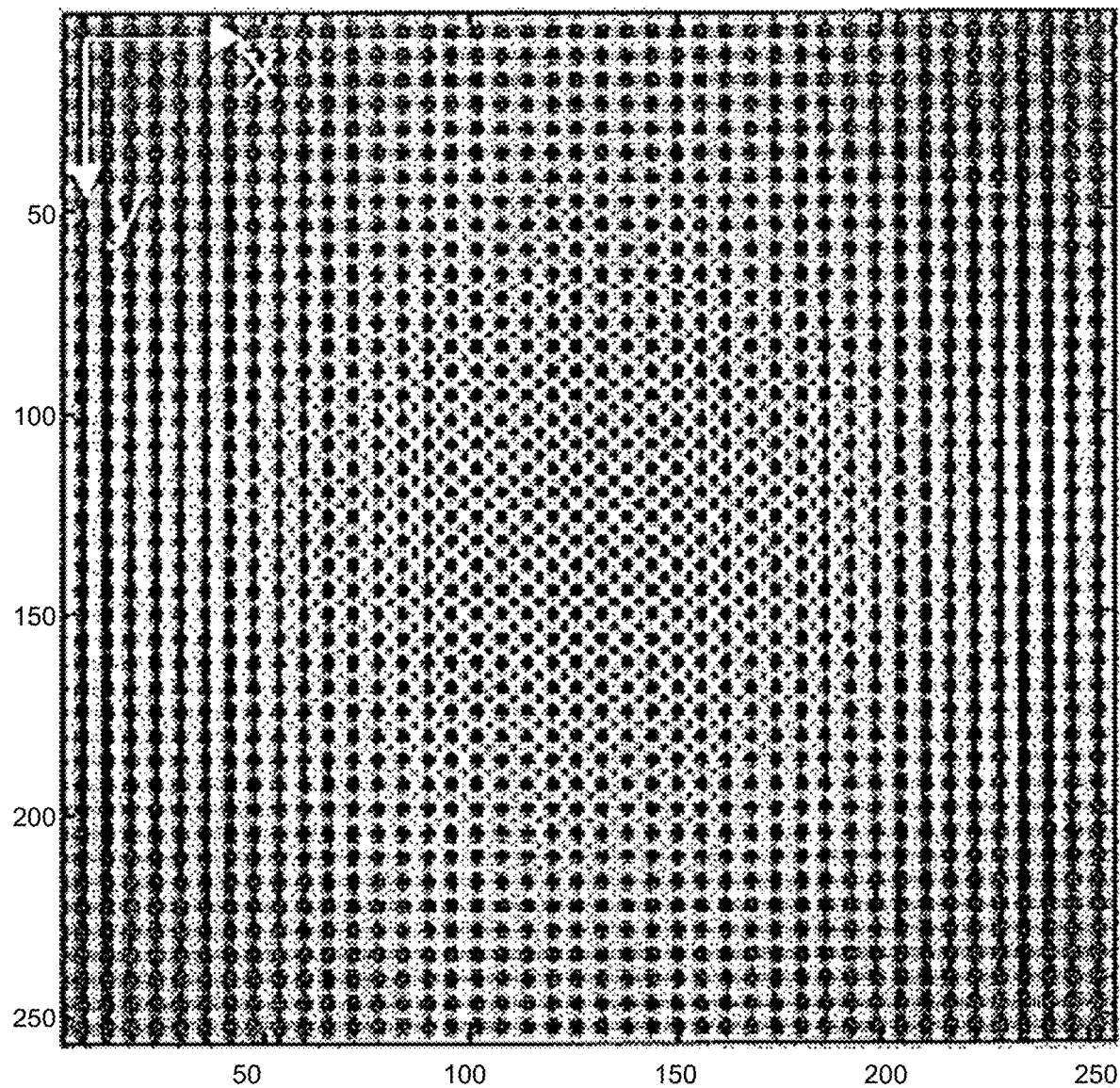
FIG. 7 shows the light distribution when an illumination pattern and an additional illumination pattern are incoherently superimposed.

FIG. 7 shows the light distribution generated when the illumination pattern and the additional illumination pattern are incoherently superimposed.

Figure 8A:
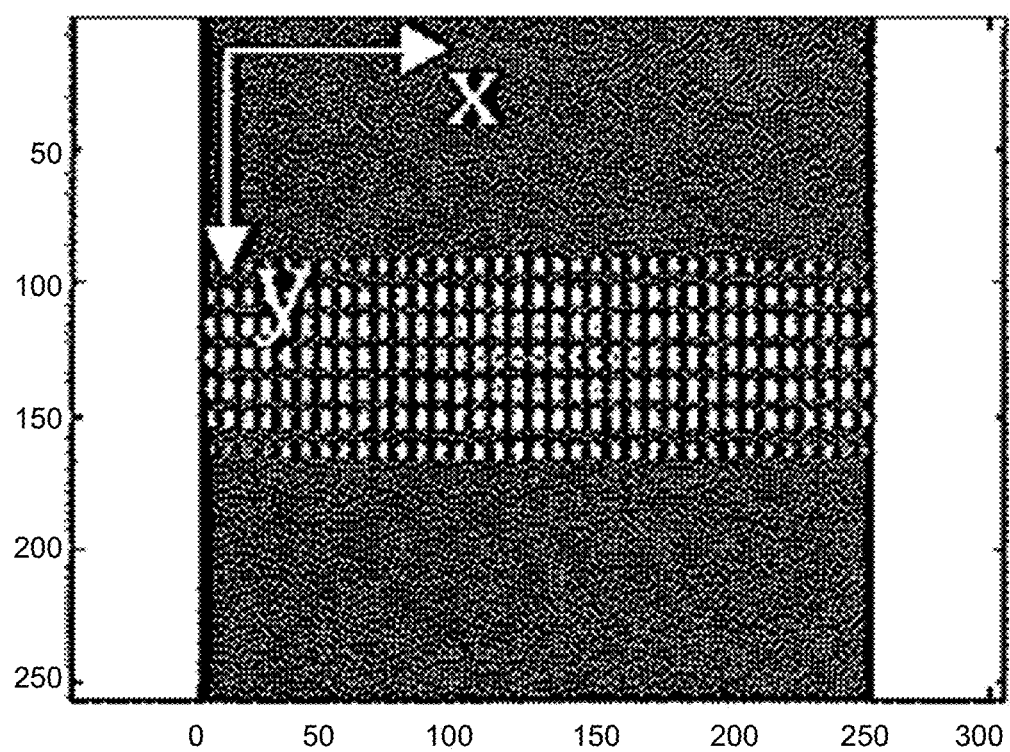
FIGS. 8A-8C show the interference pattern of two sectioned Bessel beams extending in opposite directions, FIG. 9 schematically shows the generation of an illumination pattern in a device according to the invention designed as a TIRF microscope.
Figure 8B:
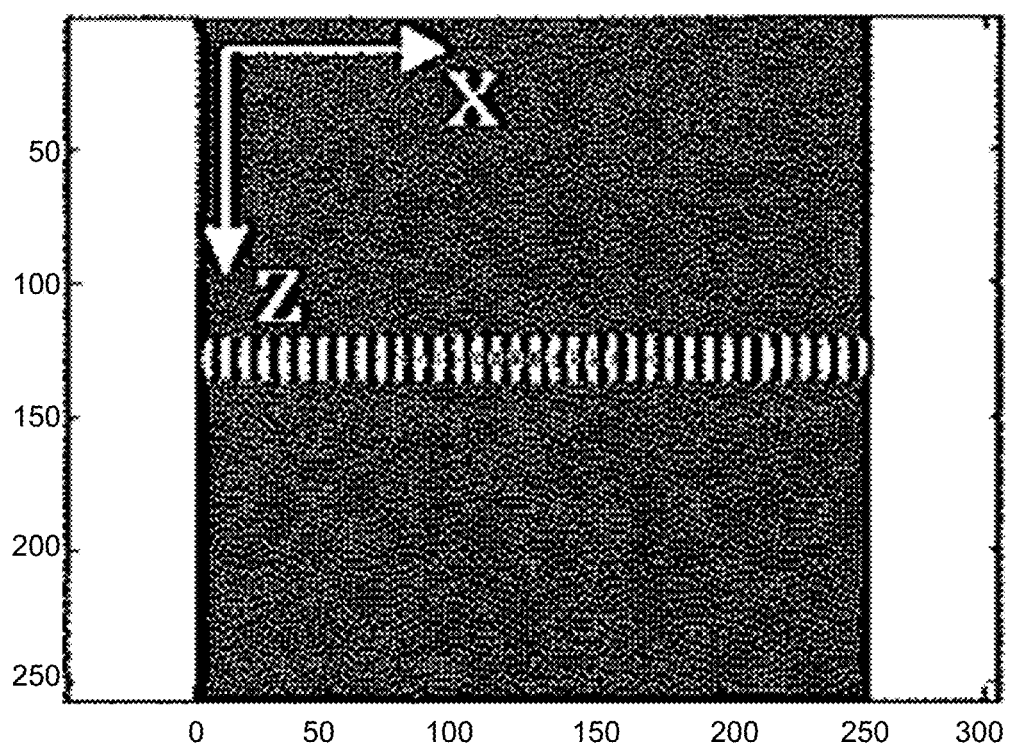
Figure 8C:
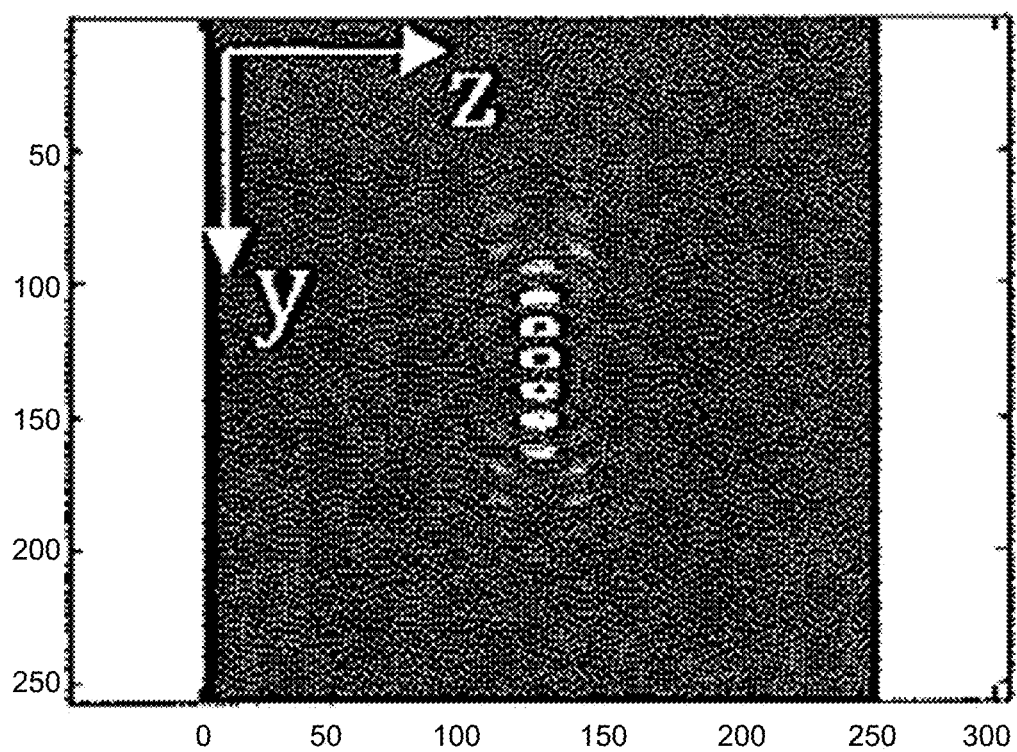

FIGS. 8A-8C show the interference pattern of two sectioned Bessel beams extending in opposite directions. By way of example, altering the phase and the lateral position of the superimposed sectioned Bessel beams can successively alter the interference pattern in order to generate a plurality of images, from the image data of which an image having enhanced contrast and higher resolution can then be computed.

Figure 9:
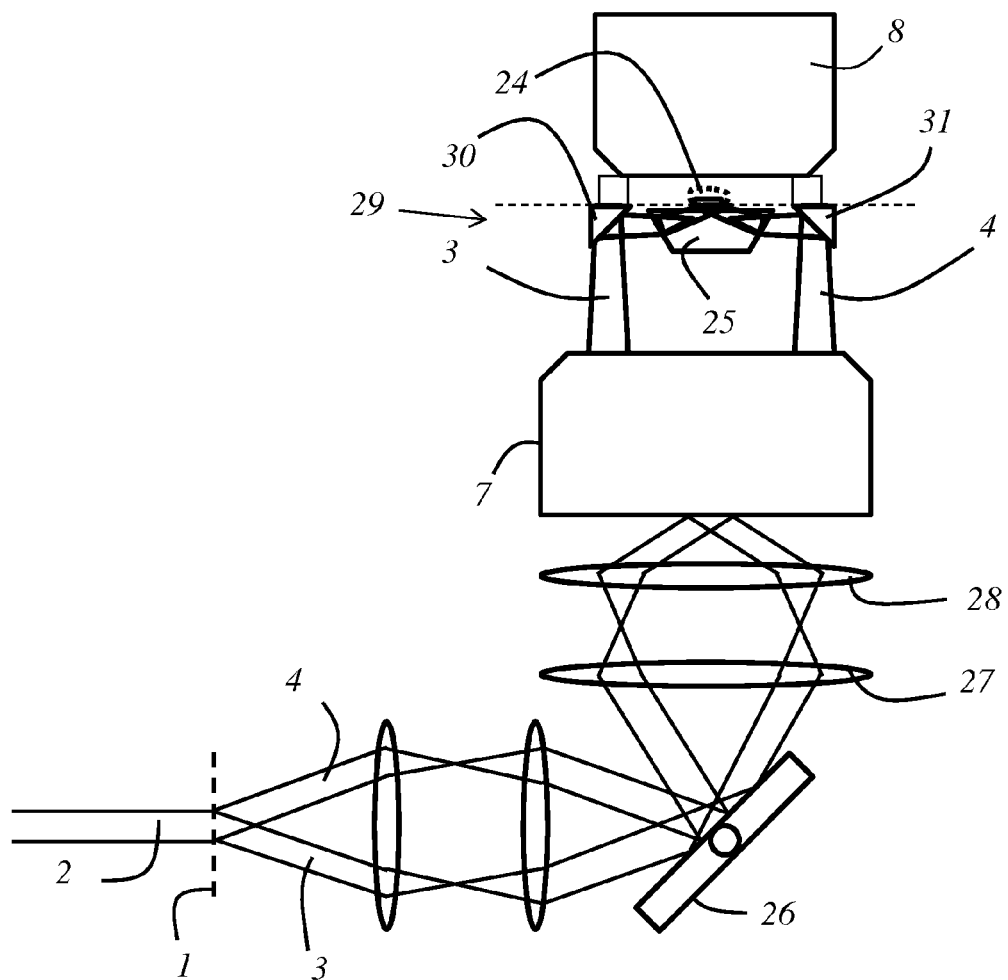

FIG. 9 schematically shows the generation of an illumination pattern in a device according to the invention designed as a TIRF microscope.

The device comprises an illumination objective 7 and a detection objective 8, between which there is arranged a sample 24 to be examined in an examination position. The sample 24 is in contact with an optically transparent medium 25 that has a higher refractive index than the sample 24. In this case, the sample can also be prepared on a cover glass that is in contact with the optically transparent medium 25, an immersion medium being able to be inserted in the space therebetween in order to minimize jumps in the refractive index.

By means of a beam deflection apparatus 26, the deflection angle of which is adjustable, a scanning lens 27 and a tube lens 28, two partial illumination light beams 3, 4 reach the illumination objective 7, pass through said objective and are then deflected by a deflection means 29 that has two deflection elements 30, 31 and is secured to the detection objective 8.

The deflection means 29 comprises a first deflection element 30 and a second deflection element 31, the optically transparent medium 25 also forming an additional deflection element (in addition to its function of providing a planar boundary surface with the sample 24). The deflection elements 30, 31 and the entrance window to the optically transparent medium 25 deflect each partial illumination light beam 3, 4 one after the other at deflection angles of different signs and different sizes.

At the boundary surface 32 between the optically transparent medium 25 and the sample 24, the interfering partial illumination light beams 3, 4 undergo total reflection in order to illuminate the sample 24 in an evanescent manner. The evanescent field 33 penetrates the sample 24, where it causes the fluorescence dyes to be optically excited.

The fluorescent light emanating from the sample 24 passes through the detection objective 8 and is focused onto the active surface of a position-sensitive detector, which is in the form of a planar detector, for example.

The beam deflection apparatus 26 comprises a cardanically suspended mirror that makes it possible to deflect the partial illumination light beams 3, 4 at any given deflection angle in two planes that are perpendicular to one another. In this way, the spatial position and the propagation direction of the partial illumination light beams 3, 4 exiting the illumination objective 7 can be adjusted largely freely. It is thus possible, for example, to deflect the partial illumination light beams 3, 4 onto another pair of deflection means instead of onto the deflection elements 30, 31, in order, for example, to alter the orientation of the illumination pattern.

Alternatively to a cardanically suspended mirror 26, the beam deflection apparatus could also for example comprise at least two deflecting elements, in particular deflecting mirrors, that are connected optically in series and can deflect the partial illumination light beams 3, 4 in deflection planes that are perpendicular to one another.

The partial illumination light beams 3, 4 are generated from an illumination light beam 2 using a splitting means 1, which can be formed as a lattice, for example.

Alternatively or in addition, it is also conceivable, for example, for the splitting means 1 to be mounted rotatably about an axis or cardanically, and for the rotatability of the beam deflection apparatus 26 to optionally be limited to just one axis, provided that the ability to freely orient the partial illumination light beams is unaffected.

Figure 10:
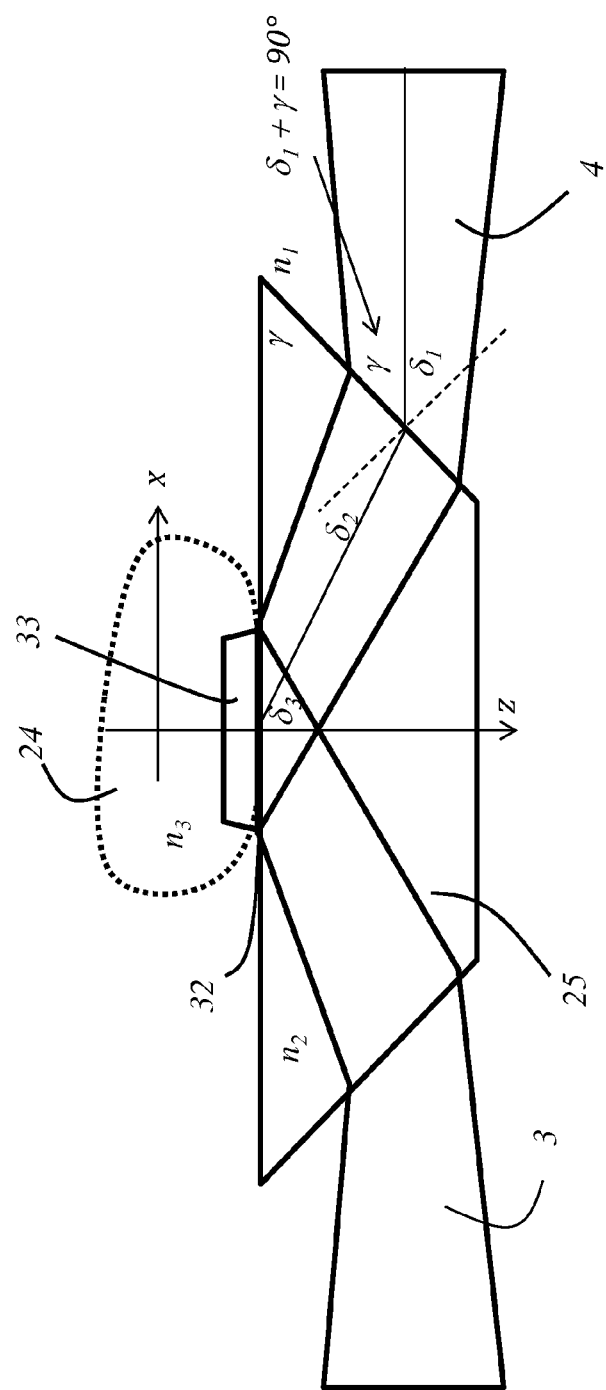
FIG. 10 is a detailed view of the device shown in FIG. 9.

FIG. 10 is a detailed view of the sample region of the device shown in FIG. 9, and in particular of the light paths of the interfering partial illumination light beams 3, 4 in the region of the sample 24.

Lastly, it is explicitly pointed out that the above-described embodiments merely serve to describe the claimed teaching, but do not restrict said teaching to the embodiments. In particular, all features in this description and/or their functions, actions and properties taken in isolation and/or in combination with one another that a person skilled in the relevant art would envisage individually or in combination in order to solve the objective problem or associated problems, optionally using their specialist knowledge in the art, are deemed disclosed herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 splitting means
2 illumination light beam
3 partial illumination light beam
4 partial illumination light beam
5 lenses
6 tube lens
7 illumination objective
8 detection objective
9 deflection mirror
10 deflection mirror
11 illumination plane
12 illumination pattern
13 additional illumination pattern
14 additional deflection mirror
15 additional deflection mirror
16 point lattice 17 additional illumination pattern
18 additional illumination pattern
19 additional deflection mirror
20 additional deflection mirror
21 additional deflection mirror
22 additional deflection mirror
23 point lattice
24 sample
25 optically transparent medium
26 beam deflection apparatus
27 scanning lens
28 tube lens
29 deflection means
30 deflection element
31 deflection element
32 boundary surface
33 evanescent field
34 sample volume

The invention claimed is:

1. A method for examining a sample, the method comprising:
   a. generating an illumination light beam using a light source,
   b. spatially splitting the illumination light beam into at least two partial illumination light beams using a splitter,
   c. guiding the partial illumination light beams through an illumination objective shared by the partial illumination light beams,
   d. deflecting at least one of the partial illumination light beams, after the partial illumination light beams have passed through the illumination objective, using at least one deflector such that the partial illumination light beams interfere with one another in an illumination plane so as to generate an illumination pattern in the illumination plane,
   e. generating an additional illumination pattern in the illumination plane by at least two additional partial light beams interfering with one another in the illumination plane, the at least two additional partial light beams being generated using the light source and/or one or more additional light sources,
   f. repeating steps a-e to generate a second illumination pattern and a second additional illumination pattern using the light source and/or the one or more additional light sources,
   g. generating a first lattice by coherently superimposing the illumination pattern and the additional illumination pattern in the illumination plane,
   h. generating a second lattice by incoherently superimposing the second illumination pattern and the second additional illumination pattern in the illumination plane, and
   i. producing an image of a sample region illuminated by the illumination patterns and the additional illumination patterns, wherein detection light that emanates from the sample region reaches a position-sensitive detector through a detection objective.

2. The method according to claim 1, wherein the different and/or differently positioned and/or differently oriented illumination patterns are generated by:
   a. altering the phase of the partial illumination light beams, and/or
   b. altering the direction of incidence of the interfering partial illumination light beams, and/or
   c. altering the angle of incidence of the interfering partial illumination light beams on the illumination plane.

3. The method according to claim 1, wherein:
   a. the interfering partial illumination light beams and/or additional interfering partial illumination light beams are formed as Bessel beams, and/or
   b. the interfering partial illumination light beams and/or additional interfering partial illumination light beams are formed as sectioned Bessel beams.

4. The method according to claim 1, wherein:
   a. each of the partial illumination light beams and/or each additional partial illumination light beam is formed as a light sheet, and/or
   b. each of the partial illumination light beams and/or each additional partial illumination light beam is focused into the entrance pupil of the illumination objective, and/or
   c. the partial illumination light beams and/or additional partial illumination light beams are focused into the entrance pupil of the illumination objective at different angles of incidence and/or at different positions.

5. The method according to claim 1, wherein:
   a. the partial illumination light beams and/or additional partial illumination light beams propagate in different propagation directions within the illumination plane after being deflected, and/or
   b. two of the partial illumination light beams and/or two additional partial illumination light beams propagate in opposite propagation directions within the illumination plane after being deflected, and/or
   c. the illumination plane is at an angle other than 0° to the optical axis of the illumination objective, and/or
   d. the illumination plane is oriented perpendicularly to the optical axis of the illumination objective, and/or
   e. the illumination plane is at an angle other than 0° to the optical axis of the detection objective, and/or
   f. the illumination plane is oriented perpendicularly to the optical axis of the detection objective.

6. The method according to claim 1, wherein the sample is in contact with an optically transparent medium that has a higher refractive index than the sample, and wherein, in order to generate the illumination pattern, the partial illumination light beams and/or additional partial illumination light beams interfere on a boundary surface between the optically transparent medium and the sample, where the partial illumination light beams and/or the additional partial illumination light beams undergo total reflection so as to illuminate the sample in an evanescent manner.

7. The method according to claim 1, wherein:
   a. the deflector or at least one of a plurality of deflection elements of the deflector is rotatably arranged on and/or secured to the detection objective or the illumination objective, and/or
   b. the deflector comprises a plurality of deflection elements that are oriented differently, and/or
   c. each of the partial illumination light beams and/or each additional partial illumination light beam is deflected by a separate deflection element.

8. The method according to claim 1, wherein the deflector comprises at least one deflection mirror, and/or wherein at least one of a plurality of deflection elements of the deflector is formed as a deflection mirror.

9. The method according to claim 1, wherein the optical axis of the illumination objective and the optical axis of the detection objective are oriented in anti-parallel or in parallel or coaxially with one another, and/or wherein the detection objective and the illumination objective are oriented so as to be opposite one another and facing one another.

10. The method according to claim 1, wherein the first lattice is used for fluorescence excitation of the sample in the sample plane, and wherein the second lattice is used for relaxation or switching of fluorophores.

11. The method according to claim 1, wherein at least one of the lattices is used to switch fluorophores.

12. A device for examining a sample, the device comprising:
   a. a light source configured to generate an illumination light beam,
   b. a splitter configured to spatially split the illumination light beam into at least two partial illumination light beams,
   c. an illumination objective disposed and configured to allow the partial illumination light beams pass therethrough,
   d. at least one deflector configured to deflect at least one of the partial illumination light beams, after the partial illumination light beams have passed through the illumination objective, such that the partial illumination light beams interfere with one another in an illumination plane so as to generate an illumination pattern in the illumination plane, and
   e. a position-sensitive detector configured to produce an image of a sample region illuminated by the illumination pattern,
   wherein the device is configured such that detection light that emanates from the sample region reaches the position-sensitive detector through a detection objective,
   wherein the device is configured to:
      generate an additional illumination pattern in the illumination plane by at least two additional partial light beams interfering with one another in the illumination plane, the at least two additional partial light beams being generated using the light source and/or one or more additional light sources,
      generate a second illumination pattern and a second additional illumination pattern using the illumination light beam and/or the one or more additional light source,
      generate a first lattice by coherently superimposing the illumination pattern and the additional illumination pattern in the illumination plane, and
      generate a second lattice by incoherently superimposing the second illumination pattern and the second additional illumination pattern in the illumination plane.

13. The device according to claim 12, wherein the device is configured to incoherently superimpose the lattices with respect to one another.

14. The device according to claim 13, wherein:
   a. the phase of the partial illumination light beams is alterable, and/or
   b. the position and/or the orientation of at least one of the partial illumination light beams is alterable by at least one beam deflector having an adjustable deflection angle.

15. The device according to claim 12, wherein:
   a. the interfering partial illumination light beams and/or additional interfering partial illumination light beams are formed as Bessel beams, and/or
   b. the interfering partial illumination light beams and/or additional interfering partial illumination light beams are formed as sectioned Bessel beams.

16. The device according to claim 12, further comprising:
   a. at least one astigmatic optical system configured to form the illumination light beam and/or the partial illumination light beams as light sheets, and/or
   b. an optical system configured to focus each of the partial illumination light beams and/or each additional partial illumination light beam into an entrance pupil of the illumination objective, and/or
   c. at least one optical system configured to focus the partial illumination light beams and/or additional partial illumination light beams into an entrance pupil of the illumination objective at different angles of incidence and/or at different positions.

17. The device according to claim 12, wherein:
   a. the partial illumination light beams and/or additional partial illumination light beams propagate in different propagation directions within the illumination plane after being deflected, and/or
   b. two of the partial illumination light beams and/or two additional partial illumination light beams propagate in opposite propagation directions within the illumination plane after being deflected, and/or
   c. the illumination plane is at an angle other than 0° to the optical axis of the illumination objective, and/or
   d. the illumination plane is oriented perpendicularly to the optical axis of the illumination objective, and/or
   e. the illumination plane is at an angle other than 0° to the optical axis of the detection objective, and/or
   f. the illumination plane is oriented perpendicularly to the optical axis of the detection objective.

18. The device according to claim 12, further comprising an optically transparent medium with which the sample is in contact, the optically transparent medium having a higher refractive index than the sample, and wherein the device is configured such that, in order to generate the illumination pattern, the partial illumination light beams and/or additional partial illumination light beams interfere on a boundary surface between the optically transparent medium and the sample, where the partial illumination light beams and/or the additional partial illumination light beams undergo total reflection so as to illuminate the sample in an evanescent manner.

19. The device according to claim 12, wherein:
   a. the deflector or at least one of a plurality of deflection elements of the deflector is arranged on and/or secured to the detection objective or the illumination objective, and/or
   b. the deflector comprises a plurality of deflection elements that are oriented differently, and/or
   c. each of the partial illumination light beams and/or each additional partial illumination light beam is deflected by a separate deflection element.

20. The device according to claim 12, wherein the deflector comprises at least one deflection mirror, and/or wherein at least one of a plurality of deflection elements of the deflector is formed as a deflection mirror.

21. The device according to claim 12, wherein the optical axis of the illumination objective and the optical axis of the detection objective are oriented in parallel or coaxially with one another, and/or wherein the detection objective and the illumination objective are oriented so as to be opposite one another and facing one another.

22. The method according to claim 1, wherein the second lattice is incoherently superimposed on the first lattice.

23. The method according to claim 22, wherein the second lattice has a different wavelength than the first lattice, and/or was generated using a different one of the light sources.

24. The method according to claim 1, wherein the lattices are generated simultaneously and/or illuminate the sample at the same time.

25. The method according to claim 1, wherein the lattices are crossed lattices with the illumination patterns forming the lattices being rotated 90° with respect to one another.

26. The method according to claim 1, wherein the second lattice has a different wavelength than the first lattice, the method further comprising elongating a period of a respective one of the lattices having a shorter period by tilting respective ones of the illumination light beams and/or partial illumination light beams.

27. The device according to claim 17, wherein the second lattice has a different wavelength than the first lattice, and/or was generated using a different one of the light sources.

* * * * *